US011109355B2

United States Patent
(12) United States Patent
Zhou et al.

(10) Patent No.: US 11,109,355 B2
(45) **Date of Patent: *Aug. 31, 2021**

(54) INTERRUPTION AND DELAY FOR V2X SIDELINK CARRIER AGGREGATION

(71) Applicant: INTEL CORPORATION, Santa Clara, CA (US)

(72) Inventors: Yuhan Zhou, Santa Clara, CA (US); Jie Cui, Santa Clara, CA (US); Yang Tang, Santa Clara, CA (US); Andrey Chervyakov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 16/407,006

(22) Filed: May 8, 2019

(65) Prior Publication Data

US 2019/0313376 A1 Oct. 10, 2019

Related U.S. Application Data

(63) Continuation of application No. 16/376,990, filed on Apr. 5, 2019.

(60) Provisional application No. 62/654,194, filed on Apr. 6, 2018.

(51) Int. Cl.
*H04W 72/04* (2009.01)
*H04W 4/44* (2018.01)

(52) U.S. Cl.
CPC ............ *H04W 72/04* (2013.01); *H04W 4/44* (2018.02)

(58) Field of Classification Search
CPC ................................ H04W 72/04; H04W 4/44
See application file for complete search history.

(56) References Cited

U.S. PATENT DOCUMENTS

| | | | |
|---|---|---|---|
| 2018/0124656 A1 | 5/2018 | Park et al. | |
| 2018/0324621 A1 | 11/2018 | Thangarasa et al. | |
| 2018/0332564 A1* | 11/2018 | Lee | H04W 4/40 |
| 2019/0058508 A1 | 2/2019 | Yiu | |
| 2019/0116608 A1* | 4/2019 | Kim | H04W 72/1263 |
| 2019/0246420 A1* | 8/2019 | Park | H04W 72/0433 |
| 2020/0304940 A1* | 9/2020 | Thangarasa | H04W 48/12 |

OTHER PUBLICATIONS

3GPP TS 36.101, "3rd Generation Partnership Project; Technical Specification Group Radio Access Network; Evolved Universal Terrestrial Radio Access (E-UTRA); User Equipment (UE) radio transmission and reception (Release 15)", V15.1.0, Dec. 2017, 1635 pages.

3GPP TS 36.331, "3rd Generation Partnership Project; Technical Specification Group Radio Access Network; Evolved Universal Terrestrial Radio Access (E-UTRA); Radio Resource Control (RRC); Protocol specfcaiton (Release 15)", V15.1.0, Mar. 2018, 786 pages.

* cited by examiner

*Primary Examiner* — Duc C Ho
(74) *Attorney, Agent, or Firm* — Alliance IP, LLC

(57) ABSTRACT

Systems and methods provide solutions for delay and interruption requirements for vehicle-to-everything (V2X) sidelink carrier aggregation (CA). For example, when any number of component carriers is added for V2X CA, a user equipment (UE) capable of V2X sidelink communication is allowed an interruption of up to two subframes to the cellular network. The interruption may be for both uplink and downlink of a serving cell or primary cell.

12 Claims, 12 Drawing Sheets

200

DECODE RADIO RESOURCE CONTROL (RRC) SIGNAL COMPRISING COMPONENT CARRIER ADDITION OR RELEASE COMMAND FOR VEHICLE-TO-EVERYTHING (V2X) CARRIER AGGREGATION (CA) IN WIRELESS WIDE AREA NETWORK (WAN) — 202

DETERMINE THAT UE IS CONFIGURED FOR V2X SIDELINK COMMUNICATION — 204

IN RESPONSE TO COMPONENT CARRIER ADDITION OR RELEASE COMMAND AND DETERMINATION THAT UE IS CONFIGURED FOR V2X SIDELINK COMMUNICATION, INTERRUPT COMMUNICATIONS WITH WAN FOR UP TO TWO SUBFRAMES FOR RADIO FREQUENCY (RF) CHAIN CONFIGURATION — 206

INTERRUPTION AND DELAY FOR V2X SIDELINK CARRIER AGGREGATION

CROSS-REFERENCE TO RELATED APPLICATION(S)

This application is a continuation of U.S. patent application Ser. No. 16/376,990, filed Apr. 5, 2019, which claims the benefit under 35 U.S.C. § 119(e) of U.S. Provisional Application No. 62/654,194 filed Apr. 6, 2018, each of which is hereby incorporated by reference herein in its entirety.

TECHNICAL FIELD

This application relates generally to wireless communication systems, and more specifically to vehicle-to-everything (V2X) sidelink carrier aggregation (CA).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The delay and interruption requirements for vehicle-to-everything (V2X) sidelink carrier aggregation (CA) are not specified in current 3GPP standards. Embodiments herein introduce various delay and interruption requirements for V2X sidelink CA.

A. Interruption to Sidelink Communications

In one embodiment, when a component carrier for V2X CA is added or released, an interruption to sidelink communications is up to one subframe (two subframes if it is based on a Uu interface timeline).

For V2X CA, the aggregated carriers are intra-band. One common design is that the UE uses a single radio frequency (RF) transmit (Tx)/receive (Rx) chain for transmission/reception of V2X sidelink signals on the aggregated carriers. When a sidelink component carrier is added or released, a UE may need to perform RF tuning (adjustment of center frequency and aggregated bandwidth). In certain implementations, in case of shared Tx/Rx chains architecture for carriers, the Rx chain operation may be interrupted for up to 200 microseconds (μs).

Additionally, up to one cyclic prefix (CP) length of synchronization error between two components carriers should also been included. Thus, according to certain embodiments herein, an interruption up to 1 millisecond (ms) is allowed for component carrier addition or release in PC5 CA, which leaves enough implementation margin. Persons skilled in the art will recognize from the disclosure herein that a PC5 interface may also be referred to as a device-to-device interface, a V2X PC5 interface, or a sidelink interface. Whereas two UEs may communicate through an LTE-Uu interface (also referred to as an LTE radio interface or simply a Uu interface) wherein data traverses an eNB, data communication between UEs through the PC5 interface does not need to go through the eNB.

Figure 1:
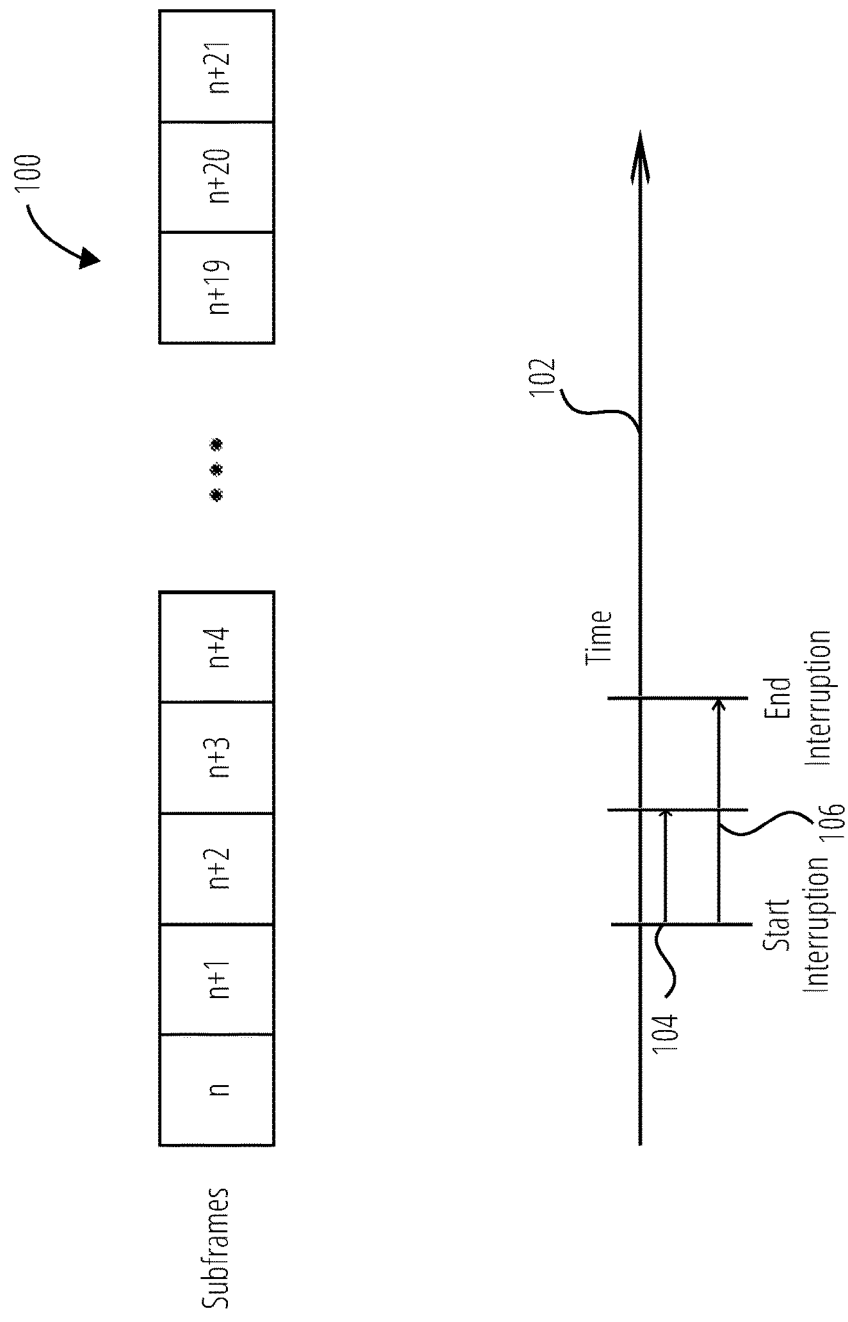
FIG. 1 illustrates a diagram showing subframes and interruption times in accordance with certain embodiments.

FIG. 1 illustrates a diagram showing subframes 100 and interruption time line 102 in accordance with certain embodiments. As persons skilled in the art recognize, each of the subframes 100 n, n+1, n+2, n+3, n+4, n+19, n+20, n+21, etc. may be part of one a respective a radio frame. In certain embodiments, one frame may be divided into ten subframes of 1 ms each. Assuming that a UE receives a component carrier addition or release command through dedicated radio resource control (RRC) signaling at subframe n, then by no later than subframe n+19, the UE may decode the component carrier addition/release command. The interruptions on PC5 CA might follow either Uu or PC5 subframe boundaries depending on which timeline is prioritized by the UE. It takes up to one subframe for the interruption if the UE follows PC5 subframe boundaries (shown as a first interruption time 104 on the time line 102 of FIG. 1). However, it takes up to two subframes for the interruption (shown as a second interruption time 106) if the UE follows Uu subframe boundaries given the fact that the transmission on PC5 and Uu interfaces can be asynchronous.

B. Interruption to Cellular Communications

In certain embodiments, when a component carrier for V2X CA is added or released, an interruption to cellular communications is up to two subframes.

Transmission on the Uu interface and transmission on the PC5 interface use different bands. Thus, the component carriers on the Uu interface and the PC5 interface are inter-band and can be either synchronous or asynchronous.

The existence of interruption to Uu link communication caused by component carrier addition/release on the PC5 link depends on UE implementation. For example, if cellular and sidelink communication share the same crystal oscillator or PLL for different RF chains, it is common to have interruption between PC5 link and Uu link. If a separate design is adopted, i.e., the receivers/transmitters for cellular and sidelink communication are completely independent, there may be no interruption needed. Thus, in certain embodiments, up to one subframe interruption is needed for sidelink CA. Due to the fact that PC5 and Uu transmission could be asynchronous, the one subframe interruption caused by sidelink CA may be across two subframes of the cellular communication. Thus, an interruption of 2 ms (e.g., corresponding to two subframes) is provided for cellar communication considering asynchronous reference timing between Uu and PC5 interfaces.

Thus, in certain embodiments, for interruptions on a serving cell or primary cell (PCell) due to V2X component carrier addition or release, when any number of component carriers is added or released for V2X carrier aggregation (e.g., using an RRC connection reconfiguration message), a UE capable of V2X sidelink communication is allowed an interruption of up to two subframes to the wide area network (WAN) (e.g., the cellular network). In certain embodiments, this interruption is for both uplink (UL) and downlink (DL) of the serving cell and/or the PCell.

C. Delay Time for Component Carrier Addition or Release

In certain embodiments, the delay on component carrier addition or release for V2X sidelink CA in transmission mode 3 (e.g., connected mode) can be defined as the time period from the end of DL subframe with RRC configuration message until the moment when UE is ready for to perform V2X RX or TX transmission.

In certain such embodiments, the delay time for single component carrier addition/release is up to 21 ms, and the delay time for multiple component carrier addition/release is up to 20+N ms, where N is the number of component carrier added/released.

For V2X CA, component carrier (CC) addition/release is based on dedicated RRC signaling for connected mode UEs. The respective delay requirement can be defined as the delay from the end of DL subframe with RRC configuration message until the moment when UE is ready for to perform V2X RX or TX. The addition/release delay time can be expressed as: Delay time=RRC processing time+time for RF tuning/re-tuning.

As defined in 3GPP TS 36.331, the RRCConnectionReconfiguration message may include dedicated configuration information for V2X sidelink communication, and the processing time for RRC connection reconfiguration is 20 ms. Here the 20 ms is calculated from the end of reception of the E-UTRAN to UE message on the UE physical layer up to when the UE is ready for the reception of uplink grant for the UE to E-UTRAN response message with no access delay other than the transmission time interval (TTI) alignment (e.g., excluding delays caused by scheduling, the random access procedure or physical layer synchronization).

It is noted that the RRC processing time on component carrier addition and release for V2X CA may be up to 20 ms. Further, RF switching time may be 200 microseconds (μB) for intra-band V2X CA. In addition, some time margin may be added for UE implementation. Thus, certain embodiments herein use 1 ms for RF tuning on the CC addition/release in PC5 CA.

It is also noted that The RF tuning/retuning time on component carrier addition and release for V2X CA may be up to 1 ms. In addition, the RRC reconfiguration completion may not mean the action of CC addition/release is accomplished. It is not clear if the UE will report to the eNB on the completion of CC addition/release on UE RX. If such report does not exist for sidelink CA, the action of CC addition/release on V2X CA maybe not testable.

In certain embodiments, for a UE configured in sidelink transmission mode 3, upon receiving a V2X carrier addition or release command through an RRC Connection Reconfiguration message that includes dedicated configuration information for V2X sidelink communication (e.g., RRCConnectionReconfiguration message with sl-V2X-ConfigDedicated parameter) in WAN subframe n, the UE accomplishes the V2X component carrier addition/release no later than the end of WAN subframe n+21+N, where N is the number of component carriers added and/or released.

Figure 2:
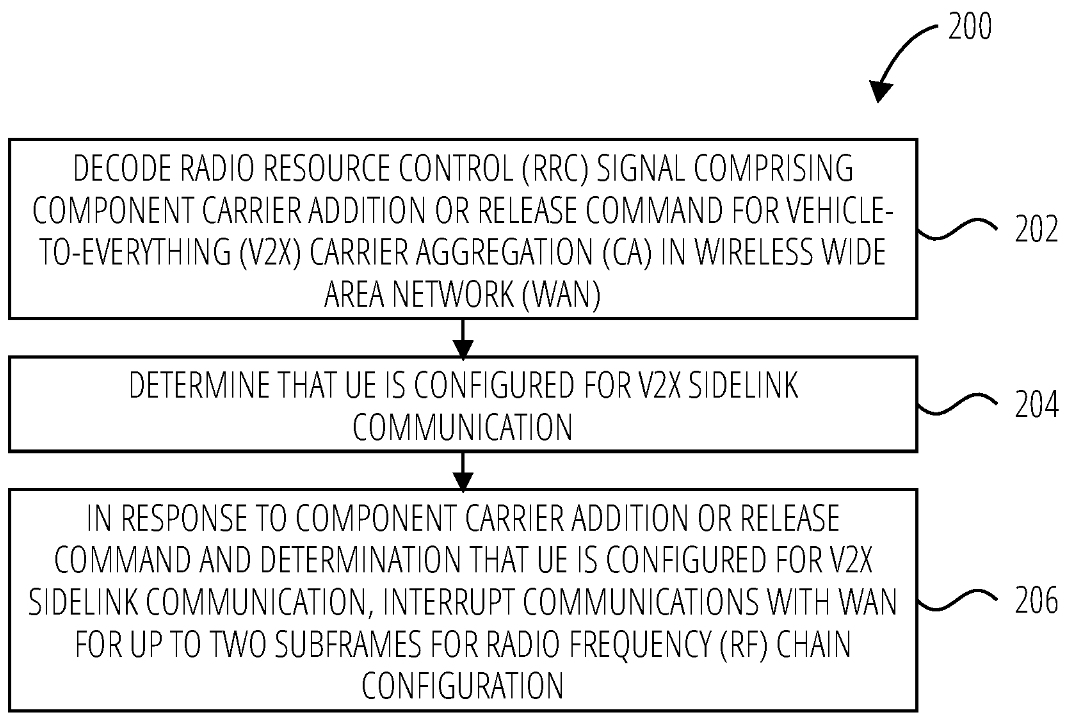
FIG. 2 illustrates a method for a UE in accordance with one embodiment.

FIG. 2 illustrates a method 200 for a UE in accordance with one embodiment. In block 202, method 200 decodes a radio resource control (RRC) signal comprising a component carrier addition or release command for vehicle-to-everything (V2X) carrier aggregation (CA) in a wireless wide area network (WAN). In block 204, method 200 determines that the UE is configured for V2X sidelink communication. In block 206, method 200 in response to the component carrier addition or release command and the determination that the UE is configured for V2X sidelink communication, interrupts communications with the WAN for up to two subframes for radio frequency (RF) chain configuration. In certain embodiments, interrupting communications with the WAN comprises suspending data communication for both uplink and downlink on a serving cell or primary cell (PCell) of a cellular communications network. In addition or in other embodiments, interrupting communications with the WAN for up to two subframes comprises interrupting communications with the WAN for up to 2 milliseconds.

D. Example Embodiments

Figure 3:
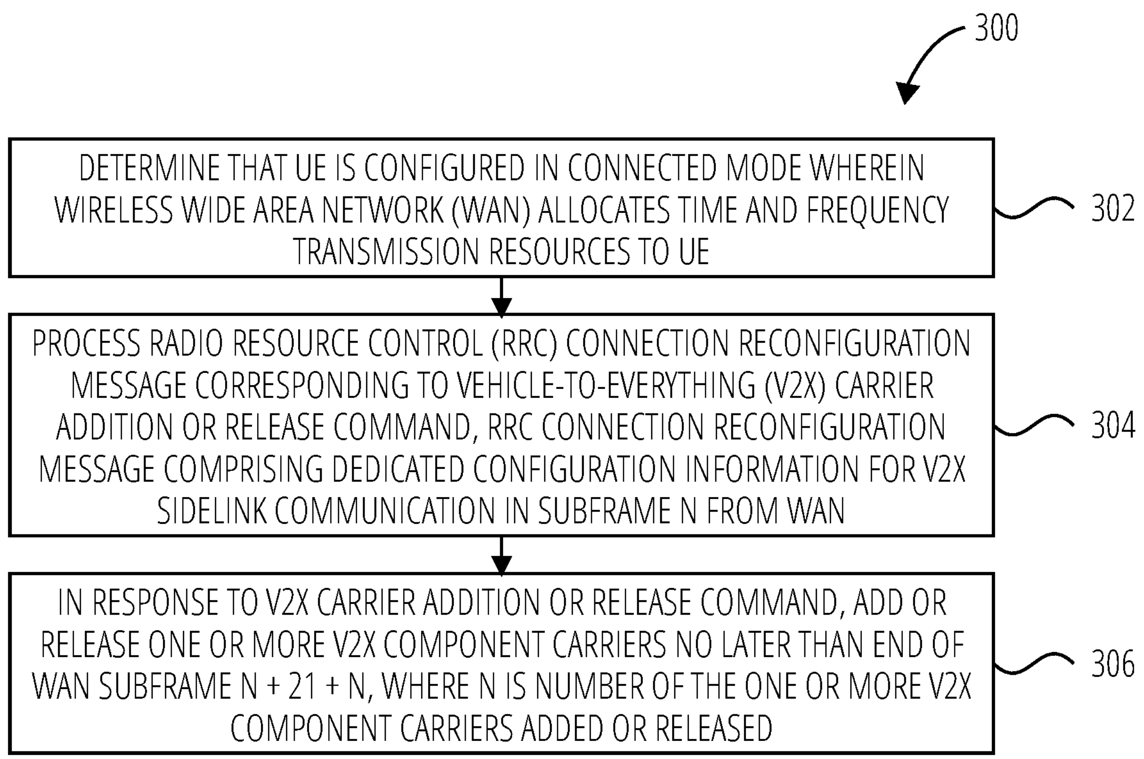
FIG. 3 illustrates a method for UE in accordance with another embodiment.

FIG. 3 illustrates a method 300 for a UE in accordance with one embodiment. In block 302, method 300 determines that the UE is configured in a connected mode wherein a wireless wide area network (WAN) allocates time and frequency transmission resources to the UE. In block 304, method 300 processes a radio resource control (RRC) connection reconfiguration message corresponding to a vehicle-to-everything (V2X) carrier addition or release command, the RRC connection reconfiguration message comprising dedicated configuration information for V2X sidelink communication in a subframe n from the WAN. In block 306, method 300 in response to the V2X carrier addition or release command, adds or releases one or more V2X component carriers no later than an end of WAN subframe n+21+N, where N is a number of the one or more V2X component carriers added or released. In certain embodiments, the connected mode comprises a sidelink transmission mode 3.

Figure 4:
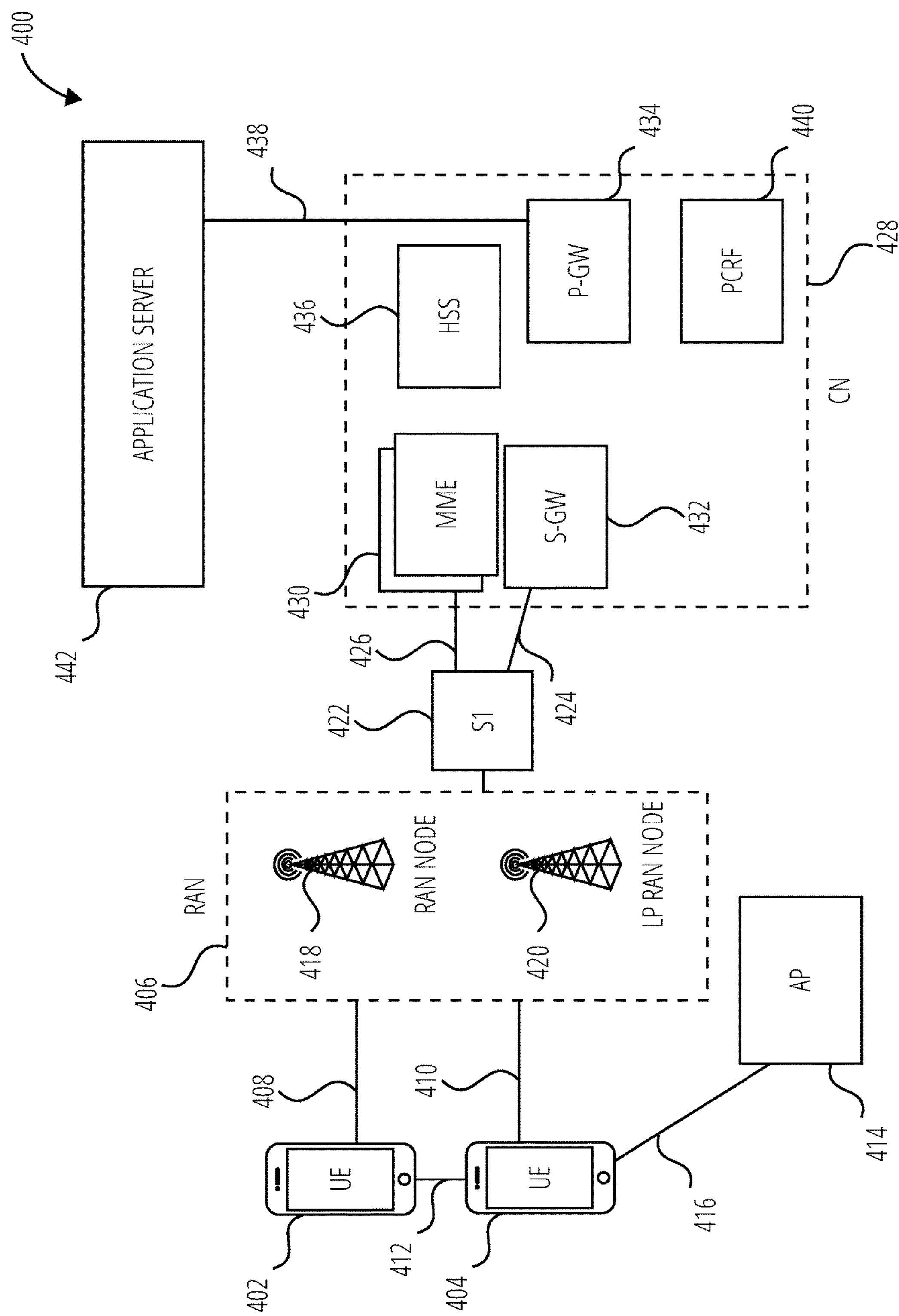
FIG. 4 illustrates a system in accordance with one embodiment.

FIG. 4 illustrates an architecture of a system 400 of a network in accordance with some embodiments. The system 400 includes one or more user equipment (UE), shown in this example as a UE 402 and a UE 404. The UE 402 and the UE 404 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 402 and the UE 404 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 402 and the UE 404 may be configured to connect, e.g., communicatively couple, with a radio access network (RAN), shown as RAN 406. The RAN 406 may be, for example, an Evolved Universal Mobile Telecommunications System (UMTS) Terrestrial Radio Access Network (E-UTRAN), a NextGen RAN (NG RAN), or some other type of RAN. The UE 402 and the UE 404 utilize connection 408 and connection 410, respectively, each of which comprises a physical communications interface or layer (discussed in further detail below); in this example, the connection 408 and the connection 410 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 402 and the UE 404 may further directly exchange communication data via a ProSe interface 412. The ProSe interface 412 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 404 is shown to be configured to access an access point (AP), shown as AP 414, via connection 416. The connection 416 can comprise a local wireless connection, such as a connection consistent with any IEEE 802.11 protocol, wherein the AP 414 would comprise a wireless fidelity (WiFi®) router. In this example, the AP 414 may be connected to the Internet without connecting to the core network of the wireless system (described in further detail below).

The RAN 406 can include one or more access nodes that enable the connection 408 and the connection 410. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 406 may include one or more RAN nodes for providing macrocells, e.g., macro RAN node 418, and one or more RAN nodes for providing femtocells or picocells (e.g., cells having smaller coverage areas, smaller user capacity, or higher bandwidth compared to macrocells), e.g., a low power (LP) RAN node such as LP RAN node 420.

Any of the macro RAN node 418 and the LP RAN node 420 can terminate the air interface protocol and can be the first point of contact for the UE 402 and the UE 404. In some embodiments, any of the macro RAN node 418 and the LP RAN node 420 can fulfill various logical functions for the RAN 406 including, but not limited to, radio network controller (RNC) functions such as radio bearer management, uplink and downlink dynamic radio resource management and data packet scheduling, and mobility management.

In accordance with some embodiments, the UE 402 and the UE 404 can be configured to communicate using Orthogonal Frequency-Division Multiplexing (OFDM) communication signals with each other or with any of the macro RAN node 418 and the LP RAN node 420 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the macro RAN node 418 and the LP RAN node 420 to the UE 402 and the UE 404, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 402 and the UE 404. The physical downlink control channel (PDCCH) may carry information about the transport format and resource allocations related to the PDSCH channel, among other things. It may also inform the UE 402 and the UE 404 about the transport format, resource allocation, and H-ARQ (Hybrid Automatic Repeat Request) information related to the uplink shared channel. Typically, downlink scheduling (assigning control and shared channel resource blocks to the UE 404 within a cell) may be performed at any of the macro RAN node 418 and the LP RAN node 420 based on channel quality information fed back from any of the UE 402 and UE 404. The downlink resource assignment information may be sent on the PDCCH used for (e.g., assigned to) each of the UE 402 and the UE 404.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 406 is communicatively coupled to a core network (CN), shown as CN 428—via an S1 interface 422. In embodiments, the CN 428 may be an evolved packet core (EPC) network, a NextGen Packet Core (NPC) network, or some other type of CN. In this embodiment the S1 interface 422 is split into two parts: the S1-U interface 424, which carries traffic data between the macro RAN node 418 and the LP RAN node 420 and a serving gateway (S-GW), shown as S-GW 432, and an S1-mobility management entity (MME) interface, shown as S1-MME interface 426, which is a signaling interface between the macro RAN node 418 and LP RAN node 420 and the MME(s) 430.

In this embodiment, the CN 428 comprises the MME(s) 430, the S-GW 432, a Packet Data Network (PDN) Gateway (P-GW) (shown as P-GW 434), and a home subscriber server (HSS) (shown as HSS 436). The MME(s) 430 may be similar in function to the control plane of legacy Serving General Packet Radio Service (GPRS) Support Nodes (SGSN). The MME(s) 430 may manage mobility aspects in access such as gateway selection and tracking area list management. The HSS 436 may comprise a database for network users, including subscription-related information to support the network entities' handling of communication sessions. The CN 428 may comprise one or several HSS 436, depending on the number of mobile subscribers, on the capacity of the equipment, on the organization of the network, etc. For example, the HSS 436 can provide support for routing/roaming, authentication, authorization, naming/addressing resolution, location dependencies, etc.

The S-GW 432 may terminate the S1 interface 322 towards the RAN 406, and routes data packets between the RAN 406 and the CN 428. In addition, the S-GW 432 may be a local mobility anchor point for inter-RAN node handovers and also may provide an anchor for inter-3GPP mobility. Other responsibilities may include lawful intercept, charging, and some policy enforcement.

The P-GW 434 may terminate an SGi interface toward a PDN. The P-GW 434 may route data packets between the CN 428 (e.g., an EPC network) and external networks such as a network including the application server 442 (alternatively referred to as application function (AF)) via an Internet Protocol (IP) interface (shown as IP communications interface 438). Generally, an application server 442 may be an element offering applications that use IP bearer resources with the core network (e.g., UMTS Packet Services (PS) domain, LTE PS data services, etc.). In this embodiment, the P-GW 434 is shown to be communicatively coupled to an application server 442 via an IP communications interface 438. The application server 442 can also be configured to support one or more communication services (e.g., Voice-over-Internet Protocol (VoIP) sessions, PTT sessions, group communication sessions, social networking services, etc.) for the UE 402 and the UE 404 via the CN 428.

The P-GW 434 may further be a node for policy enforcement and charging data collection. A Policy and Charging Enforcement Function (PCRF) (shown as PCRF 440) is the policy and charging control element of the CN 428. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 440 may be communicatively coupled to the application server 442 via the P-GW 434. The application server 442 may signal the PCRF 440 to indicate a new service flow and select the appropriate Quality of Service (QoS) and charging parameters. The PCRF 440 may provision this rule into a Policy and Charging Enforcement Function (PCEF) (not shown) with the appropriate traffic flow template (TFT) and QoS class of identifier (QCI), which commences the QoS and charging as specified by the application server 442.

Figure 5:
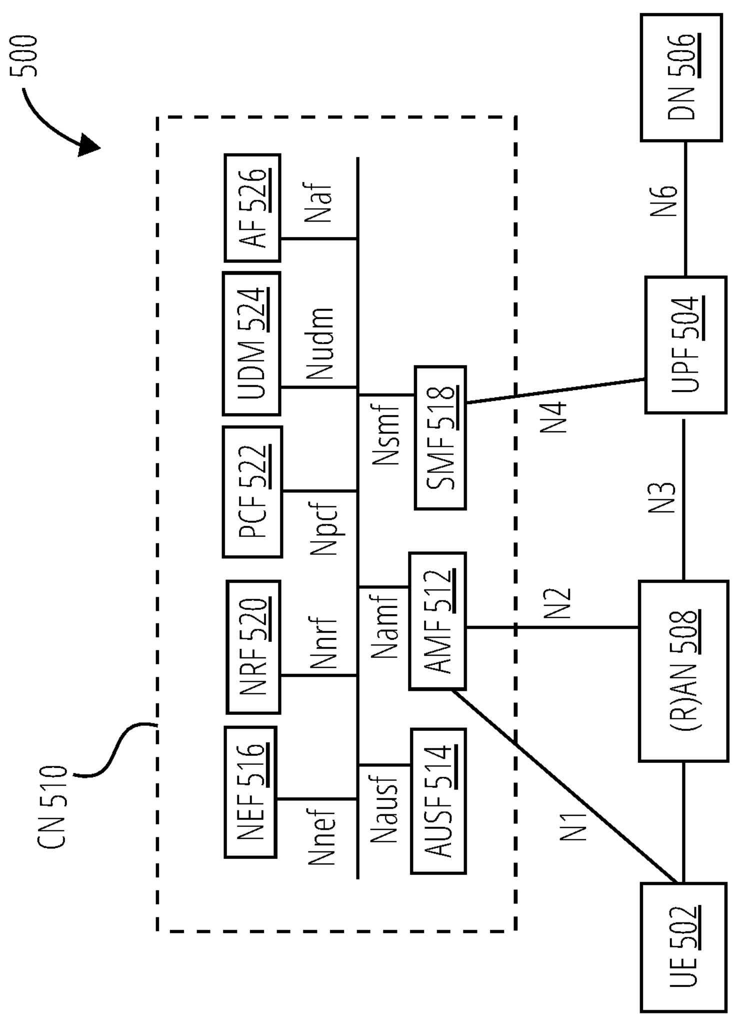
FIG. 5 illustrates a system in accordance with one embodiment.

FIG. 5 illustrates an architecture of a system 500 of a network in accordance with some embodiments. The system 500 is shown to include a UE 502, which may be the same or similar to the UE 402 and the UE 404 discussed previously; a 5G access node or RAN node (shown as (R)AN node 508), which may be the same or similar to the macro RAN node 418 and/or the LP RAN node 420 discussed previously; a User Plane Function (shown as UPF 504); a Data Network (DN 506), which may be, for example, operator services, Internet access or 3rd party services; and a 5G Core Network (5GC) (shown as CN 510).

The CN 510 may include an Authentication Server Function (AUSF 514); a Core Access and Mobility Management Function (AMF 512); a Session Management Function (SMF 518); a Network Exposure Function (NEF 516); a Policy Control Function (PCF 522); a Network Function (NF) Repository Function (NRF 520); a Unified Data Management (UDM 524); and an Application Function (AF 526). The CN 510 may also include other elements that are not shown, such as a Structured Data Storage network function (SDSF), an Unstructured Data Storage network function (UDSF), and the like.

The UPF 504 may act as an anchor point for intra-RAT and inter-RAT mobility, an external PDU session point of interconnect to DN 506, and a branching point to support multi-homed PDU session. The UPF 504 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 504 may include an uplink classifier to support routing traffic flows to a data network. The DN 506 may represent various network operator services, Internet access, or third party services. DN 506 may include, or be similar to the application server 442 discussed previously.

The AUSF 514 may store data for authentication of UE 502 and handle authentication related functionality. The AUSF 514 may facilitate a common authentication framework for various access types.

The AMF 512 may be responsible for registration management (e.g., for registering UE 502, etc.), connection management, reachability management, mobility management, and lawful interception of AMF-related events, and access authentication and authorization. AMF 512 may provide transport for SM messages for the SMF 518, and act as a transparent proxy for routing SM messages. AMF 512 may also provide transport for short message service (SMS) messages between UE 502 and an SMS function (SMSF) (not shown by FIG. 5). AMF 512 may act as Security Anchor Function (SEA), which may include interaction with the AUSF 514 and the UE 502, receipt of an intermediate key that was established as a result of the UE 502 authentication process. Where USIM based authentication is used, the AMF 512 may retrieve the security material from the AUSF 514. AMF 512 may also include a Security Context Management (SCM) function, which receives a key from the SEA that it uses to derive access-network specific keys. Furthermore, AMF 512 may be a termination point of RAN CP interface (N2 reference point), a termination point of NAS (NI) signaling, and perform NAS ciphering and integrity protection.

AMF 512 may also support NAS signaling with a UE 502 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control□plane NAS (NI) signaling between the UE 502 and AMF 512, and relay uplink and downlink user-plane packets between the UE 502 and UPF 504. The N3IWF also provides mechanisms for IPsec tunnel establishment with the UE 502.

The SMF 518 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 518 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

The NEF 516 may provide means for securely exposing the services and capabilities provided by 3GPP network functions for third party, internal exposure/re-exposure, Application Functions (e.g., AF 526), edge computing or fog computing systems, etc. In such embodiments, the NEF 516 may authenticate, authorize, and/or throttle the AFs. NEF 516 may also translate information exchanged with the AF 526 and information exchanged with internal network functions. For example, the NEF 516 may translate between an AF-Service-Identifier and an internal 5GC information. NEF 516 may also receive information from other network functions (NFs) based on exposed capabilities of other network functions. This information may be stored at the NEF 516 as structured data, or at a data storage NF using a standardized interfaces. The stored information can then be re-exposed by the NEF 516 to other NFs and AFs, and/or used for other purposes such as analytics.

The NRF 520 may support service discovery functions, receive NF Discovery Requests from NF instances, and provide the information of the discovered NF instances to the NF instances. NRF 520 also maintains information of available NF instances and their supported services.

The PCF 522 may provide policy rules to control plane function(s) to enforce them, and may also support unified policy framework to govern network behavior. The PCF 522 may also implement a front end (FE) to access subscription information relevant for policy decisions in a UDR of UDM 524.

The UDM 524 may handle subscription-related information to support the network entities' handling of communication sessions, and may store subscription data of UE 502. The UDM 524 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 522. UDM 524 may also support SMS management, wherein an SMS-FE implements the similar application logic as discussed previously.

The AF 526 may provide application influence on traffic routing, access to the Network Capability Exposure (NCE), and interact with the policy framework for policy control. The NCE may be a mechanism that allows the 5GC and AF 526 to provide information to each other via NEF 516, which may be used for edge computing implementations. In such implementations, the network operator and third party services may be hosted close to the UE 502 access point of attachment to achieve an efficient service delivery through the reduced end-to-end latency and load on the transport network. For edge computing implementations, the 5GC may select a UPF 504 close to the UE 502 and execute traffic steering from the UPF 504 to DN 506 via the N6 interface. This may be based on the UE subscription data, UE location, and information provided by the AF 526. In this way, the AF 526 may influence UPF (re)selection and traffic routing. Based on operator deployment, when AF 526 is considered to be a trusted entity, the network operator may permit AF 526 to interact directly with relevant NFs.

As discussed previously, the CN 510 may include an SMSF, which may be responsible for SMS subscription checking and verification, and relaying SM messages to/from the UE 502 to/from other entities, such as an SMS□GMSC/IWMSC/SMS-router. The SMS may also interact with AMF 512 and UDM 524 for notification procedure that the UE 502 is available for SMS transfer (e.g., set a UE not reachable flag, and notifying UDM 524 when UE 502 is available for SMS).

The system 500 may include the following service-based interfaces: Namf: Service-based interface exhibited by AMF; Nsmf: Service-based interface exhibited by SMF; Nnef: Service-based interface exhibited by NEF; Npcf: Service□based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 500 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 510 may include an Nx interface, which is an inter-CN interface between the MME (e.g., MME(s) 430) and the AMF 512 in order to enable interworking between CN 510 and CN 428.

Although not shown by FIG. 5, the system 500 may include multiple RAN nodes (such as (R)AN node 508) wherein an Xn interface is defined between two or more (R)AN node 508 (e.g., gNBs and the like) that connecting to 5GC 410, between a (R)AN node 508 (e.g., gNB) connecting to CN 510 and an eNB (e.g., a macro RAN node 418 of FIG. 4), and/or between two eNBs connecting to CN 510.

In some implementations, the Xn interface may include an Xn user plane (Xn□U) interface and an Xn control plane (Xn-C) interface. The Xn-U may provide non□guaranteed delivery of user plane PDUs and support/provide data forwarding and flow control functionality. The Xn-C may provide management and error handling functionality, functionality to manage the Xn-C interface; mobility support for UE 502 in a connected mode (e.g., CM-CONNECTED) including functionality to manage the UE mobility for connected mode between one or more (R)AN node 508. The mobility support may include context transfer from an old (source) serving (R)AN node 508 to new (target) serving (R)AN node 508; and control of user plane tunnels between old (source) serving (R)AN node 508 to new (target) serving (R)AN node 508.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 6:
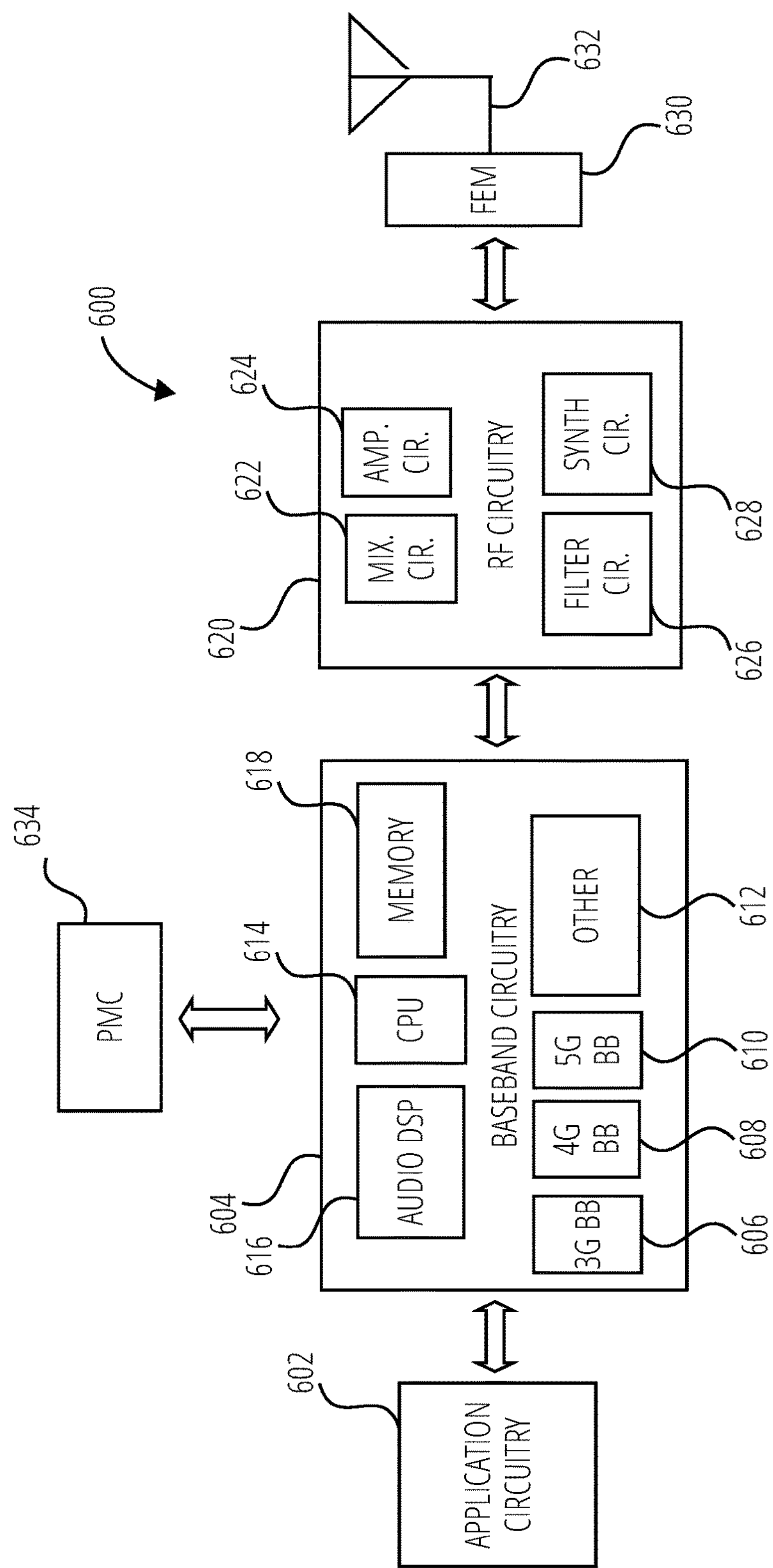
FIG. 6 illustrates a device in accordance with one embodiment.

FIG. 6 illustrates example components of a device 600 in accordance with some embodiments. In some embodiments, the device 600 may include application circuitry 602, baseband circuitry 604, Radio Frequency (RF) circuitry (shown as RF circuitry 620), front-end module (FEM) circuitry (shown as FEM circuitry 630), one or more antennas 632, and power management circuitry (PMC) (shown as PMC 634) coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 620 and to generate baseband signals for a transmit signal path of the RF circuitry 620. The baseband circuitry 604 may interface with the application circuitry 602 for generation and processing of the baseband signals and for controlling operations of the RF circuitry 620. For example, in some embodiments, the baseband circuitry 604 may include a third generation (3G) baseband processor (3G baseband processor 606), a fourth generation (4G) baseband processor (4G baseband processor 608), a fifth generation (5G) baseband processor (5G baseband processor 610), or other baseband processor(s) 612 for other existing generations, generations in development or to be developed in the future (e.g., second generation (2G), sixth generation (6G), etc.). The baseband circuitry 604 (e.g., one or more of baseband processors) may handle various radio control functions that enable communication with one or more radio networks via the RF circuitry 620. In other embodiments, some or all of the functionality of the illustrated baseband processors may be included in modules stored in the memory 618 and executed via a Central Processing Unit (CPU 614). The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include a digital signal processor (DSP), such as one or more audio DSP(s) 616. The one or more audio DSP(s) 616 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 604 is configured to support radio communications of more than one wireless protocol may be referred to as multi-mode baseband circuitry.

The RF circuitry 620 may enable communication with wireless networks using modulated electromagnetic radiation through a non-solid medium. In various embodiments, the RF circuitry 620 may include switches, filters, amplifiers, etc. to facilitate the communication with the wireless network. The RF circuitry 620 may include a receive signal path which may include circuitry to down-convert RF signals received from the FEM circuitry 630 and provide baseband signals to the baseband circuitry 604. The RF circuitry 620 may also include a transmit signal path which may include circuitry to up-convert baseband signals provided by the baseband circuitry 604 and provide RF output signals to the FEM circuitry 630 for transmission.

In some embodiments, the receive signal path of the RF circuitry 620 may include mixer circuitry 622, amplifier circuitry 624 and filter circuitry 626. In some embodiments, the transmit signal path of the RF circuitry 620 may include filter circuitry 626 and mixer circuitry 622. The RF circuitry 620 may also include synthesizer circuitry 628 for synthesizing a frequency for use by the mixer circuitry 622 of the receive signal path and the transmit signal path. In some embodiments, the mixer circuitry 622 of the receive signal path may be configured to down-convert RF signals received from the FEM circuitry 630 based on the synthesized frequency provided by synthesizer circuitry 628. The amplifier circuitry 624 may be configured to amplify the down-converted signals and the filter circuitry 626 may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, the mixer circuitry 622 of the receive signal path may comprise passive mixers, although the scope of the embodiments is not limited in this respect.

In some embodiments, the mixer circuitry 622 of the transmit signal path may be configured to up-convert input baseband signals based on the synthesized frequency provided by the synthesizer circuitry 628 to generate RF output signals for the FEM circuitry 630. The baseband signals may be provided by the baseband circuitry 604 and may be filtered by the filter circuitry 626.

In some embodiments, the mixer circuitry 622 of the receive signal path and the mixer circuitry 622 of the transmit signal path may include two or more mixers and may be arranged for quadrature downconversion and upconversion, respectively. In some embodiments, the mixer circuitry 622 of the receive signal path and the mixer circuitry 622 of the transmit signal path may include two or more mixers and may be arranged for image rejection (e.g., Hartley image rejection). In some embodiments, the mixer circuitry 622 of the receive signal path and the mixer circuitry 622 may be arranged for direct downconversion and direct upconversion, respectively. In some embodiments, the mixer circuitry 622 of the receive signal path and the mixer circuitry 622 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 620 may include analog-to-digital converter (ADC) and digital-to-analog converter (DAC) circuitry and the baseband circuitry 604 may include a digital baseband interface to communicate with the RF circuitry 620.

In some dual-mode embodiments, a separate radio IC circuitry may be provided for processing signals for each spectrum, although the scope of the embodiments is not limited in this respect.

In some embodiments, the synthesizer circuitry 628 may be a fractional-N synthesizer or a fractional N/N+1 synthesizer, although the scope of the embodiments is not limited in this respect as other types of frequency synthesizers may be suitable. For example, synthesizer circuitry 628 may be a delta-sigma synthesizer, a frequency multiplier, or a synthesizer comprising a phase-locked loop with a frequency divider.

The synthesizer circuitry 628 may be configured to synthesize an output frequency for use by the mixer circuitry 622 of the RF circuitry 620 based on a frequency input and a divider control input. In some embodiments, the synthesizer circuitry 628 may be a fractional N/N+1 synthesizer.

In some embodiments, frequency input may be provided by a voltage controlled oscillator (VCO), although that is not a requirement. Divider control input may be provided by either the baseband circuitry 604 or the application circuitry 602 (such as an applications processor) depending on the desired output frequency. In some embodiments, a divider control input (e.g., N) may be determined from a look-up table based on a channel indicated by the application circuitry 602.

Synthesizer circuitry 628 of the RF circuitry 620 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 628 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 620 may include an IQ/polar converter.

The FEM circuitry 630 may include a receive signal path which may include circuitry configured to operate on RF signals received from one or more antennas 632, amplify the received signals and provide the amplified versions of the received signals to the RF circuitry 620 for further processing. The FEM circuitry 630 may also include a transmit signal path which may include circuitry configured to amplify signals for transmission provided by the RF circuitry 620 for transmission by one or more of the one or more antennas 632. In various embodiments, the amplification through the transmit or receive signal paths may be done solely in the RF circuitry 620, solely in the FEM circuitry 630, or in both the RF circuitry 620 and the FEM circuitry 630.

In some embodiments, the FEM circuitry 630 may include a TX/RX switch to switch between transmit mode and receive mode operation. The FEM circuitry 630 may include a receive signal path and a transmit signal path. The receive signal path of the FEM circuitry 630 may include an LNA to amplify received RF signals and provide the amplified received RF signals as an output (e.g., to the RF circuitry 620). The transmit signal path of the FEM circuitry 630 may include a power amplifier (PA) to amplify input RF signals (e.g., provided by the RF circuitry 620), and one or more filters to generate RF signals for subsequent transmission (e.g., by one or more of the one or more antennas 632).

In some embodiments, the PMC 634 may manage power provided to the baseband circuitry 604. In particular, the PMC 634 may control power-source selection, voltage scaling, battery charging, or DC-to-DC conversion. The PMC 634 may often be included when the device 600 is capable of being powered by a battery, for example, when the device 600 is included in a UE. The PMC 634 may increase the power conversion efficiency while providing desirable implementation size and heat dissipation characteristics.

FIG. 6 shows the PMC 634 coupled only with the baseband circuitry 604. However, in other embodiments, the PMC 634 may be additionally or alternatively coupled with, and perform similar power management operations for, other components such as, but not limited to, the application circuitry 602, the RF circuitry 620, or the FEM circuitry 630.

In some embodiments, the PMC 634 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
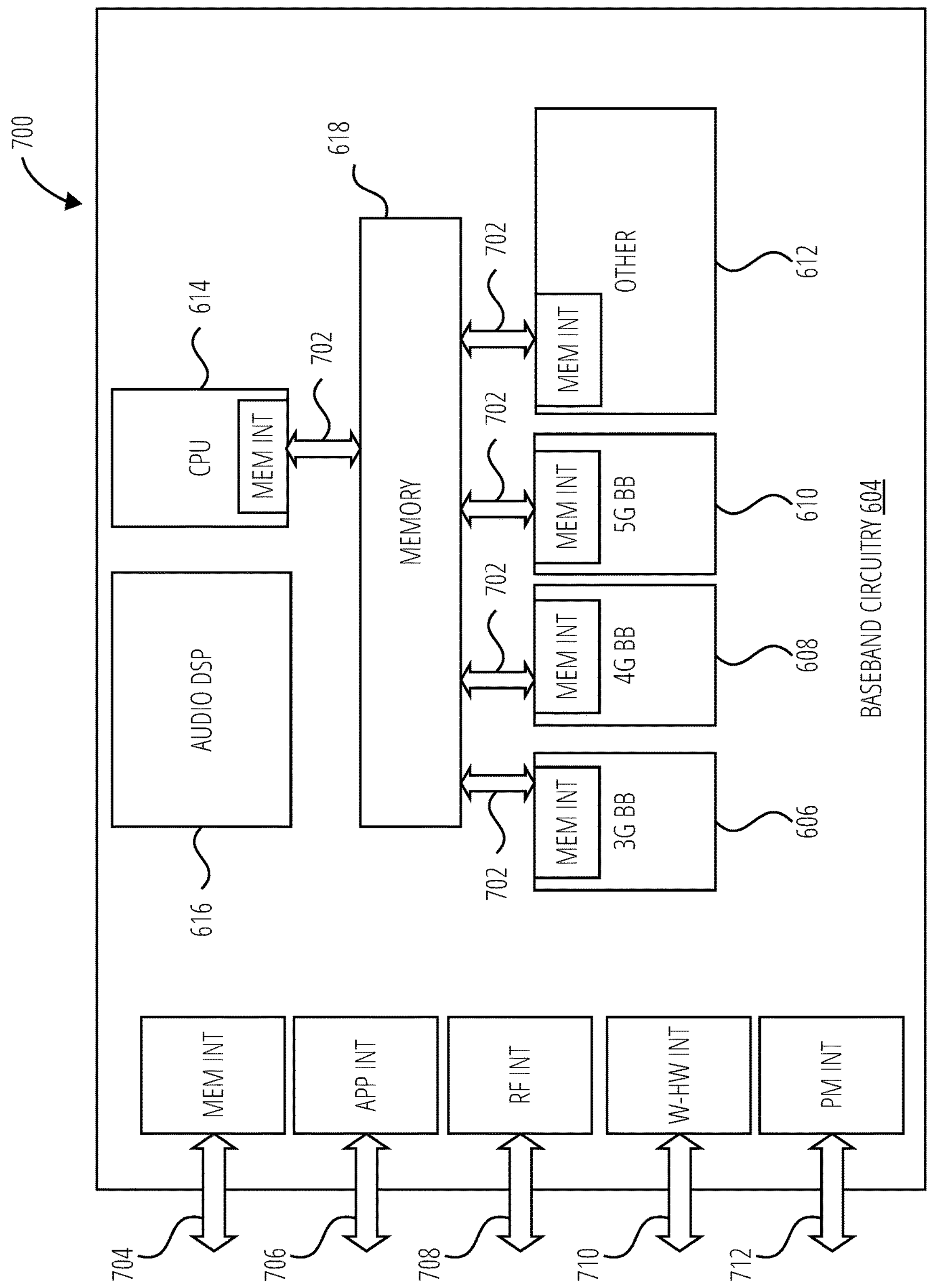
FIG. 7 illustrates example interfaces in accordance with one embodiment.

FIG. 7 illustrates example interfaces 700 of baseband circuitry in accordance with some embodiments. As discussed above, the baseband circuitry 604 of FIG. 6 may comprise 3G baseband processor 606, 4G baseband processor 608, 5G baseband processor 610, other baseband processor(s) 612, CPU 614, and a memory 618 utilized by said processors. As illustrated, each of the processors may include a respective memory interface 702 to send/receive data to/from the memory 618.

The baseband circuitry 604 may further include one or more interfaces to communicatively couple to other circuitries/devices, such as a memory interface 704 (e.g., an interface to send/receive data to/from memory external to the baseband circuitry 604), an application circuitry interface 706 (e.g., an interface to send/receive data to/from the application circuitry 602 of FIG. 6), an RF circuitry interface 708 (e.g., an interface to send/receive data to/from RF circuitry 620 of FIG. 6), a wireless hardware connectivity interface 710 (e.g., an interface to send/receive data to/from Near Field Communication (NFC) components, Bluetooth® components (e.g., Bluetooth® Low Energy), Wi-Fi® components, and other communication components), and a power management interface 712 (e.g., an interface to send/receive power or control signals to/from the PMC 634.

Figure 8:
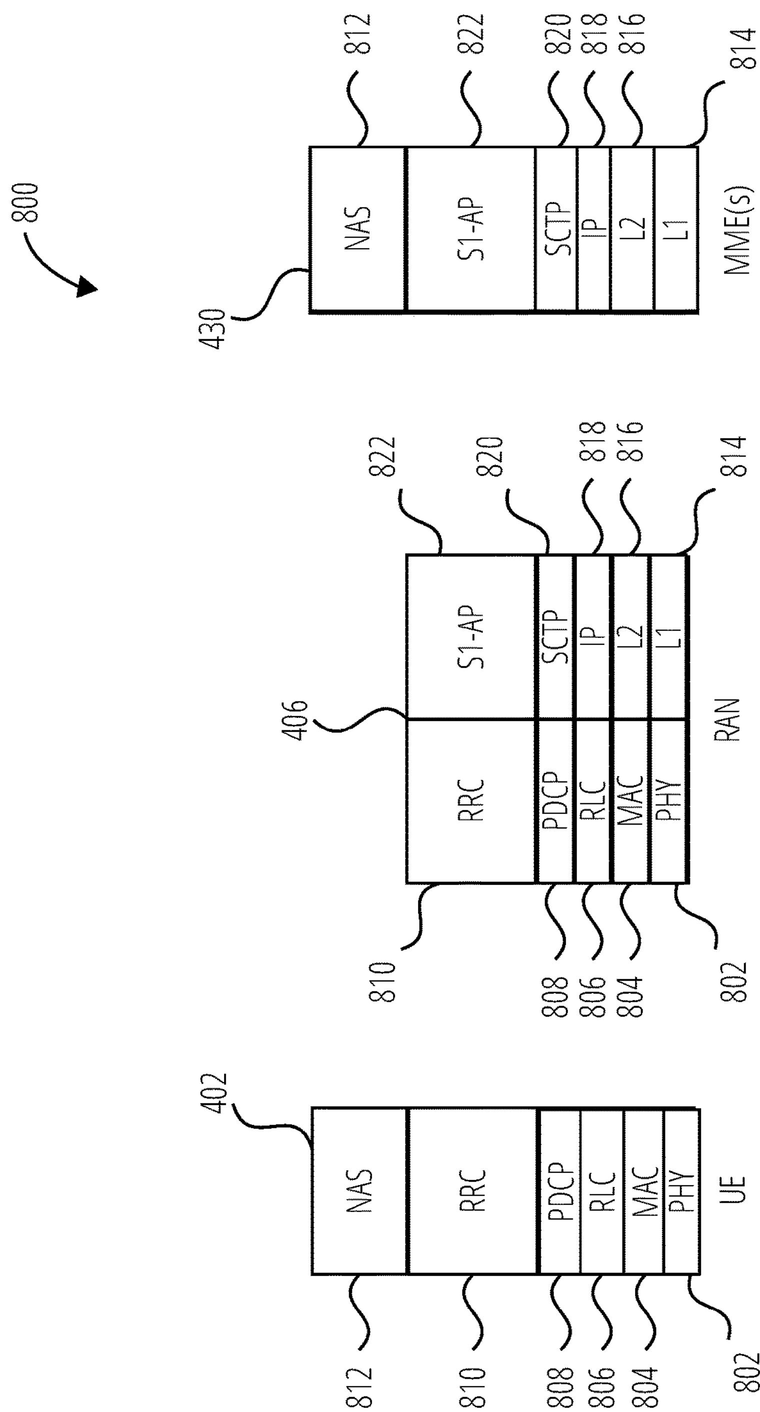
FIG. 8 illustrates a control plane in accordance with one embodiment.

FIG. 8 is an illustration of a control plane protocol stack in accordance with some embodiments. In this embodiment, a control plane 800 is shown as a communications protocol stack between the UE 402 (or alternatively, the UE 404), the RAN 406 (e.g., the macro RAN node 418 and/or the LP RAN node 420), and the MME(s) 430.

A PHY layer 802 may transmit or receive information used by the MAC layer 804 over one or more air interfaces. The PHY layer 802 may further perform link adaptation or adaptive modulation and coding (AMC), power control, cell search (e.g., for initial synchronization and handover purposes), and other measurements used by higher layers, such as an RRC layer 810. The PHY layer 802 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 804 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

An RLC layer 806 may operate in a plurality of modes of operation, including: Transparent Mode (TM), Unacknowledged Mode (UM), and Acknowledged Mode (AM). The RLC layer 806 may execute transfer of upper layer protocol data units (PDUs), error correction through automatic repeat request (ARQ) for AM data transfers, and concatenation, segmentation and reassembly of RLC SDUs for UM and AM data transfers. The RLC layer 806 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 808 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 810 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 402 and the RAN 406 may utilize a Uu interface (e.g., an LTE-Uu interface) to exchange control plane data via a protocol stack comprising the PHY layer 802, the MAC layer 804, the RLC layer 806, the PDCP layer 808, and the RRC layer 810.

In the embodiment shown, the non-access stratum (NAS) protocols (NAS protocols 812) form the highest stratum of the control plane between the UE 402 and the MME(s) 430. The NAS protocols 812 support the mobility of the UE 402 and the session management procedures to establish and maintain IP connectivity between the UE 402 and the P-GW 434.

The S1Application Protocol (S1-AP) layer (S1-AP layer 822) may support the functions of the S1 interface and comprise Elementary Procedures (EPs). An EP is a unit of interaction between the RAN 406 and the CN 428. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the stream control transmission protocol/internet protocol (SCTP/IP) layer) (SCTP layer 820) may ensure reliable delivery of signaling messages between the RAN 406 and the MME(s) 430 based, in part, on the IP protocol, supported by an IP layer 818. An L2 layer 816 and an L1 layer 814 may refer to communication links (e.g., wired or wireless) used by the RAN node and the MME to exchange information.

The RAN 406 and the MME(s) 430 may utilize an S1-MME interface to exchange control plane data via a protocol stack comprising the L1 layer 814, the L2 layer 816, the IP layer 818, the SCTP layer 820, and the S1-AP layer 822.

Figure 9:
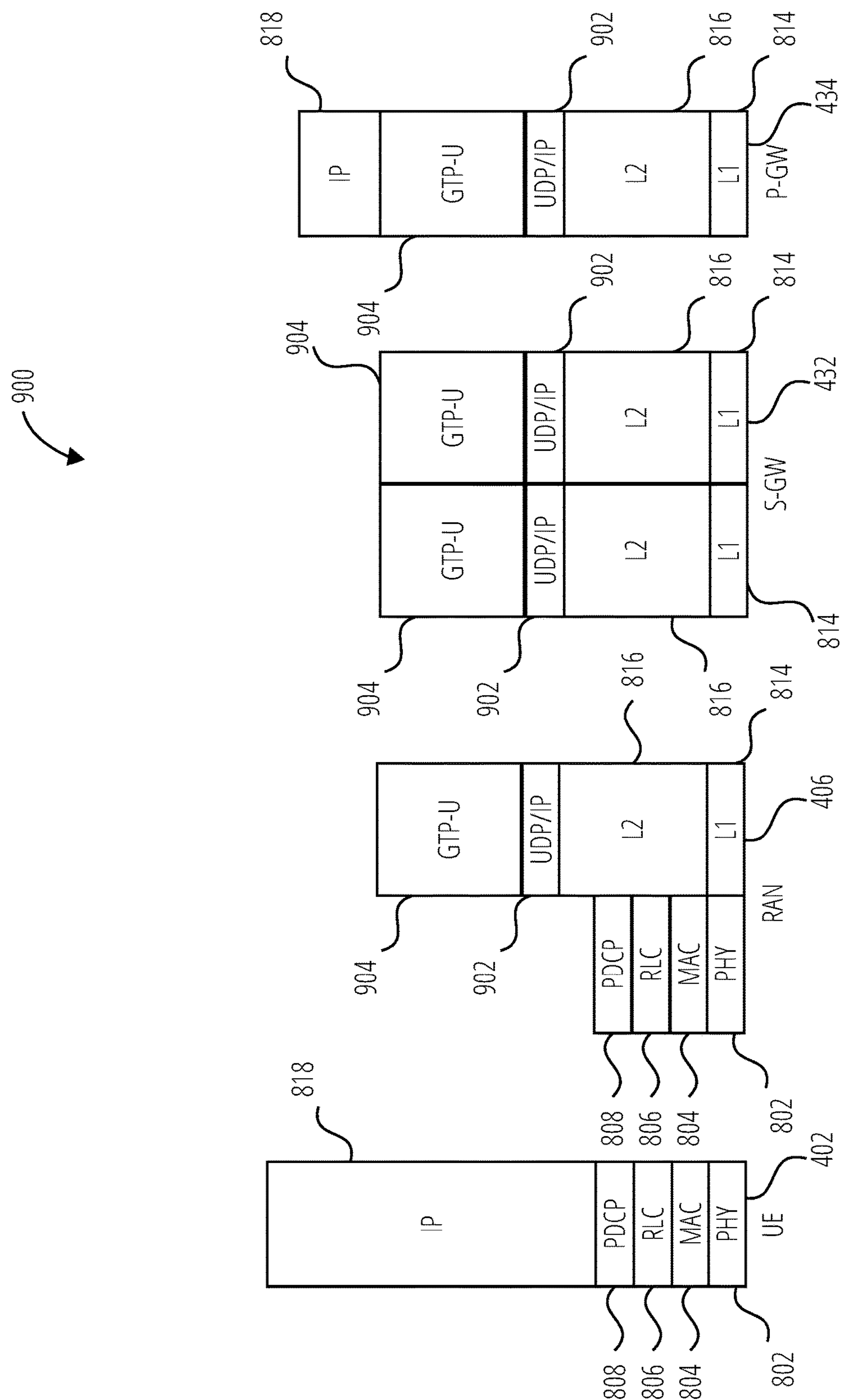
FIG. 9 illustrates a user plane in accordance with one embodiment.

FIG. 9 is an illustration of a user plane protocol stack in accordance with some embodiments. In this embodiment, a user plane 900 is shown as a communications protocol stack between the UE 402 (or alternatively, the UE 404), the RAN 406 (e.g., the macro RAN node 418 and/or the LP RAN node 420), the S-GW 432, and the P-GW 434. The user plane 900 may utilize at least some of the same protocol layers as the control plane 800. For example, the UE 402 and the RAN 406 may utilize a Uu interface (e.g., an LTE-Uu interface) to exchange user plane data via a protocol stack comprising the PHY layer 802, the MAC layer 804, the RLC layer 806, the PDCP layer 808.

The General Packet Radio Service (GPRS) Tunneling Protocol for the user plane (GTP-U) layer (GTP-U layer 904) may be used for carrying user data within the GPRS core network and between the radio access network and the core network. The user data transported can be packets in any of IPv4, IPv6, or PPP formats, for example. The UDP and IP security (UDP/IP) layer (UDP/IP layer 902) may provide checksums for data integrity, port numbers for addressing different functions at the source and destination, and encryption and authentication on the selected data flows. The RAN 406 and the S-GW 432 may utilize an S1-U interface to exchange user plane data via a protocol stack comprising the L1 layer 814, the L2 layer 816, the UDP/IP layer 902, and the GTP-U layer 904. The S-GW 432 and the P-GW 434 may utilize an S5/S8a interface to exchange user plane data via a protocol stack comprising the L1 layer 814, the L2 layer 816, the UDP/IP layer 902, and the GTP-U layer 904. As discussed above with respect to FIG. 8, NAS protocols support the mobility of the UE 402 and the session management procedures to establish and maintain IP connectivity between the UE 402 and the P-GW 434.

Figure 10:
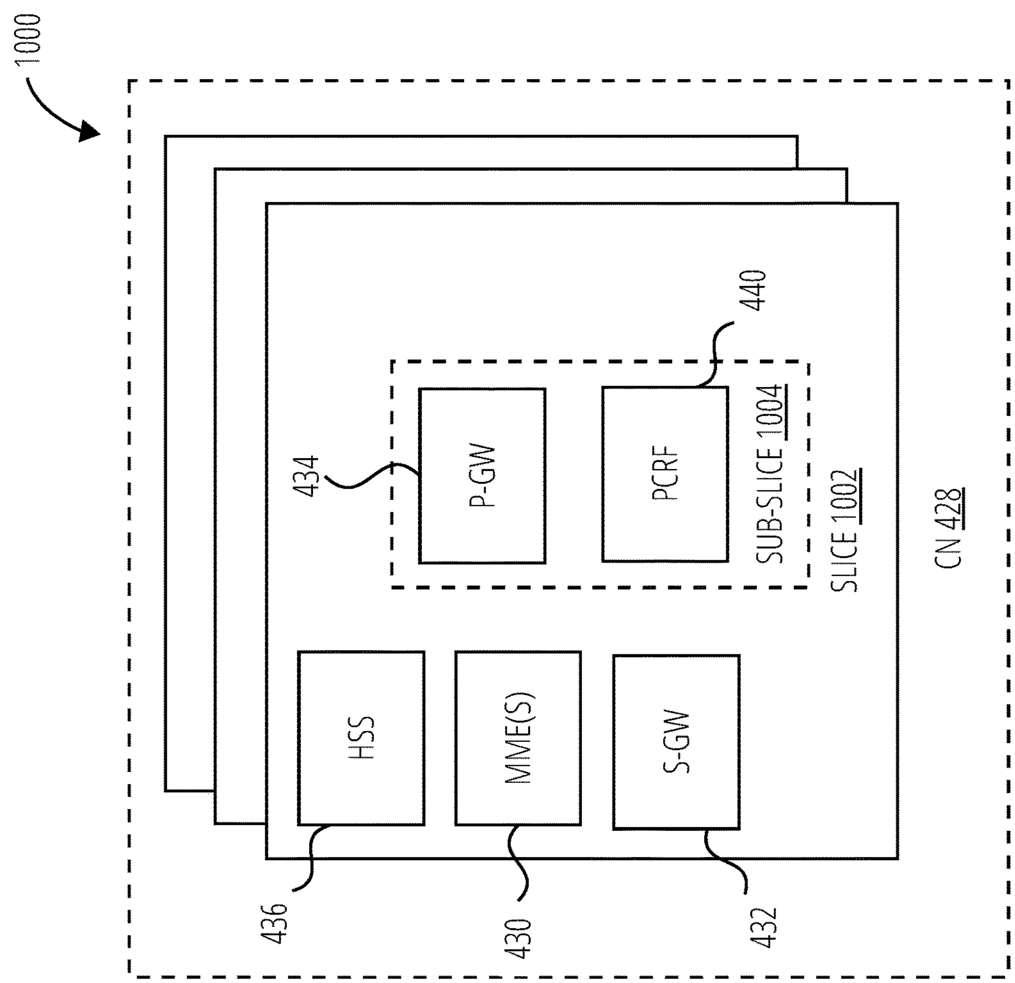
FIG. 10 illustrates components in accordance with one embodiment.

FIG. 10 illustrates components 1000 of a core network in accordance with some embodiments. The components of the CN 428 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 428 may be referred to as a network slice 1002 (e.g., the network slice 1002 is shown to include the HSS 436, the MME(s) 430, and the S-GW 432). A logical instantiation of a portion of the CN 428 may be referred to as a network sub-slice 1004 (e.g., the network sub-slice 1004 is shown to include the P-GW 434 and the PCRF 440).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 11:
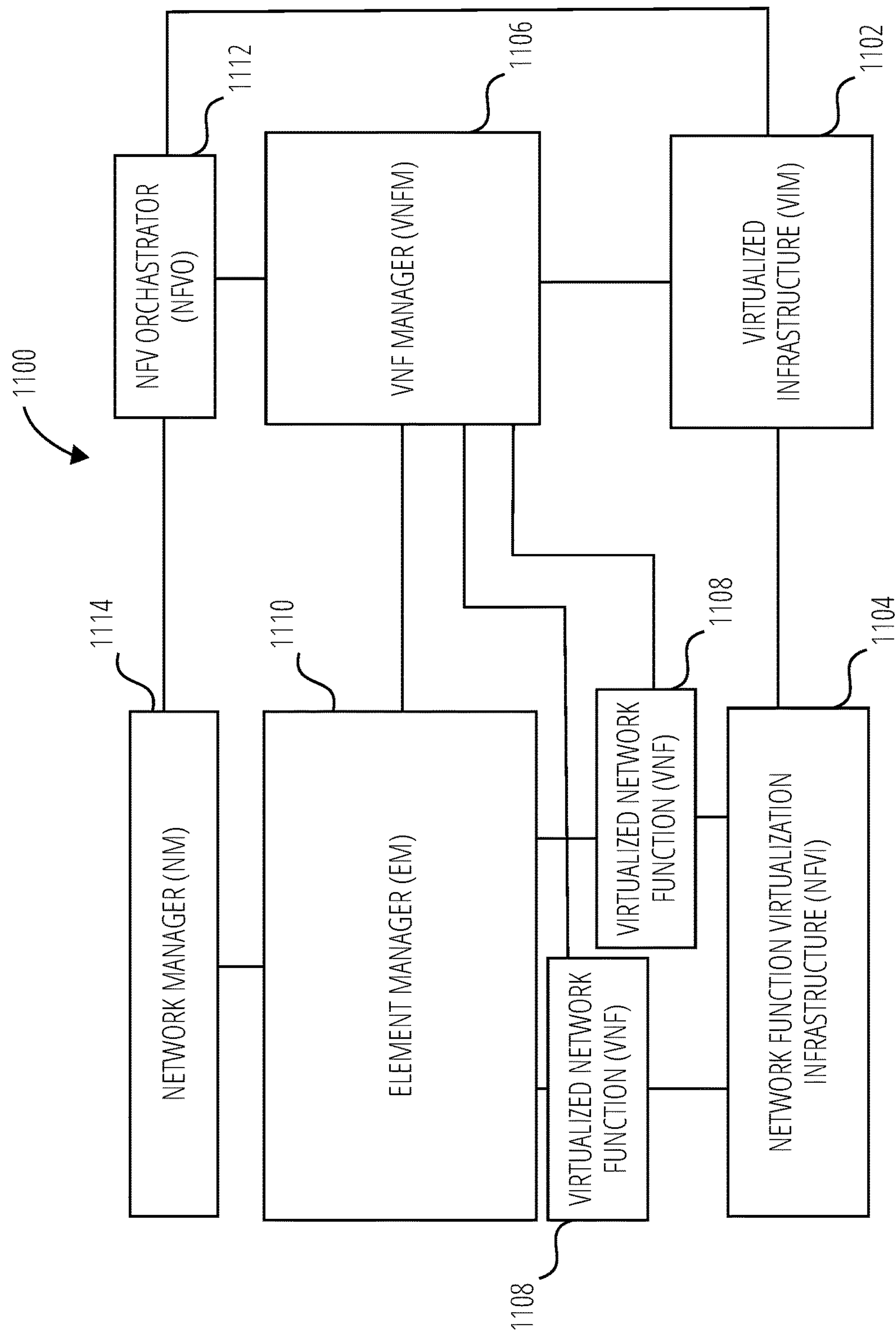
FIG. 11 illustrates a system in accordance with one embodiment.

FIG. 11 is a block diagram illustrating components, according to some example embodiments, of a system 1100 to support NFV. The system 1100 is illustrated as including a virtualized infrastructure manager (shown as VIM 1102), a network function virtualization infrastructure (shown as NFVI 1104), a VNF manager (shown as VNFM 1106), virtualized network functions (shown as VNF 1108), an element manager (shown as EM 1110), an NFV Orchestrator (shown as NFVO 1112), and a network manager (shown as NM 1114).

The VIM 1102 manages the resources of the NFVI 1104. The NFVI 1104 can include physical or virtual resources and applications (including hypervisors) used to execute the system 1100. The VIM 1102 may manage the life cycle of virtual resources with the NFVI 1104 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1106 may manage the VNF 1108. The VNF 1108 may be used to execute EPC components/functions. The VNFM 1106 may manage the life cycle of the VNF 1108 and track performance, fault and security of the virtual aspects of VNF 1108. The EM 1110 may track the performance, fault and security of the functional aspects of VNF 1108. The tracking data from the VNFM 1106 and the EM 1110 may comprise, for example, performance measurement (PM) data used by the VIM 1102 or the NFVI 1104. Both the VNFM 1106 and the EM 1110 can scale up/down the quantity of VNFs of the system 1100.

The NFVO 1112 may coordinate, authorize, release and engage resources of the NFVI 1104 in order to provide the requested service (e.g., to execute an EPC function, component, or slice). The NM 1114 may provide a package of end-user functions with the responsibility for the management of a network, which may include network elements with VNFs, non-virtualized network functions, or both (management of the VNFs may occur via the EM 1110).

Figure 12:
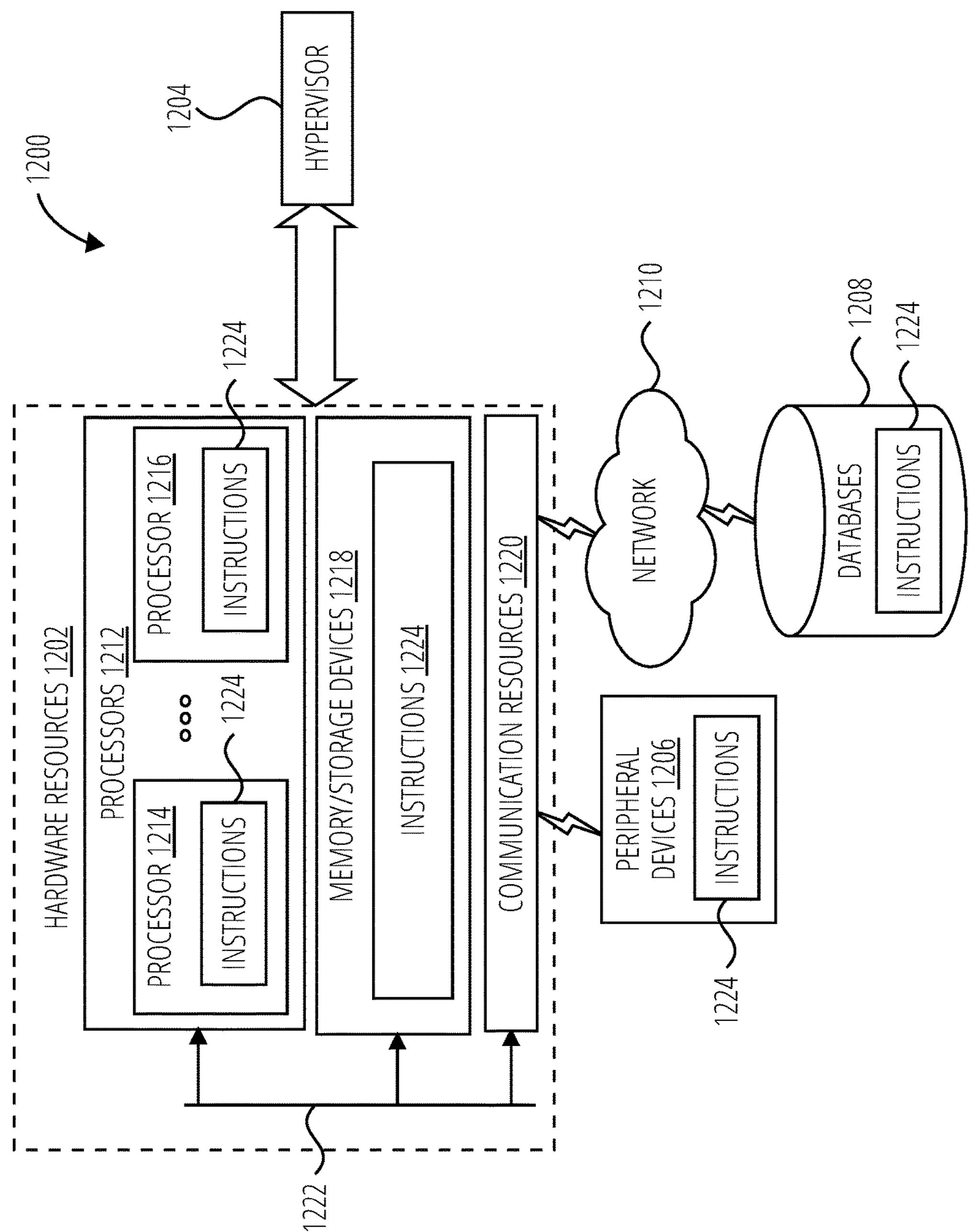
FIG. 12 illustrates components in accordance with one embodiment.

FIG. 12 is a block diagram illustrating components 1200, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1202 including one or more processors 1212 (or processor cores), one or more memory/storage devices 1218, and one or more communication resources 1220, each of which may be communicatively coupled via a bus 1222. For embodiments where node virtualization (e.g., NFV) is utilized, a hypervisor 1204 may be executed to provide an execution environment for one or more network slices/sub-slices to utilize the hardware resources 1202.

The processors 1212 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1214 and a processor 1216.

The memory/storage devices 1218 may include main memory, disk storage, or any suitable combination thereof. The memory/storage devices 1218 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1220 may include interconnection or network interface components or other suitable devices to communicate with one or more peripheral devices 1206 or one or more databases 1208 via a network 1210. For example, the communication resources 1220 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1224 may comprise software, a program, an application, an applet, an app, or other executable code for causing at least any of the processors 1212 to perform any one or more of the methodologies discussed herein. The instructions 1224 may reside, completely or partially, within at least one of the processors 1212 (e.g., within the processor's cache memory), the memory/storage devices 1218, or any suitable combination thereof. Furthermore, any portion of the instructions 1224 may be transferred to the hardware resources 1202 from any combination of the peripheral devices 1206 or the databases 1208. Accordingly, the memory of the processors 1212, the memory/storage devices 1218, the peripheral devices 1206, and the databases 1208 are examples of computer-readable and machine-readable media.

The following examples pertain to further embodiments.

Example 1A may include a method, wherein, when a component carrier for V2X CA is added or released, an interruption to sidelink communications is up to 1 subframe (2 subframes if it is based on Uu timeline).

Example 2A may include the method of example 1A and/or some other examples herein, wherein, when a component carrier for V2X CA is added or released, an interruption to cellular communications is up to 2 subframes.

Example 3A may include the method of examples 1A-2A and/or some other examples herein, wherein the delay on component carrier addition/release for V2X sidelink CA in transmission mode 3 can be defined as the time period from the end of DL subframe with RRC configuration message until the moment when UE is ready for to perform V2X RX or TX transmission.

Example 4A may include the method of example 3A and/or some other examples herein, wherein the delay requirements comprise: a delay time for single component carrier addition/release is up to 21 ms; and a delay time for multiple component carrier addition/release is up to 20+N ms, wherein N is the number of component carrier added/released.

Example 5A may include an apparatus comprising means to perform one or more elements of a method described in or related to any of examples 1A-4A, or any other method or process described herein.

Example 6A may include one or more non-transitory computer-readable media comprising instructions to cause an electronic device, upon execution of the instructions by one or more processors of the electronic device, to perform one or more elements of a method described in or related to any of examples 1A-4A, or any other method or process described herein.

Example 7A may include an apparatus comprising logic, modules, or circuitry to perform one or more elements of a method described in or related to any of examples 1A-4A, or any other method or process described herein.

Example 8A may include a method, technique, or process as described in or related to any of examples 1A-4A, or portions or parts thereof.

Example 9A may include an apparatus comprising: one or more processors and one or more computer readable media comprising instructions that, when executed by the one or more processors, cause the one or more processors to perform the method, techniques, or process as described in or related to any of examples 1A-4A, or portions thereof.

Example 10A may include a signal as described in or related to any of examples 1A-4A, or portions or parts thereof.

Example 11A may include a signal in a wireless network as shown and described herein.

Example 12A may include a method of communicating in a wireless network as shown and described herein.

Example 13A may include a system for providing wireless communication as shown and described herein.

Example 14A may include a device for providing wireless communication as shown and described herein.

Example 1B is a method for a user equipment (UE). The method includes decoding a radio resource control (RRC) signal comprising a component carrier addition or release command for vehicle-to-everything (V2X) carrier aggregation (CA) in a wireless wide area network (WAN), determining that the UE is configured for V2X sidelink communication, and in response to the component carrier addition or release command and the determination that the UE is configured for V2X sidelink communication, interrupting communications with the WAN for up to two subframes for radio frequency (RF) chain configuration.

Example 2B is the method of example 1B, wherein interrupting communications with the WAN comprises suspending data communication for both uplink and downlink on a serving cell or primary cell (PCell) of a cellular communications network.

Example 3B is the method of example 1B, wherein interrupting communications with the WAN for up to two subframes comprises interrupting communications with the WAN for up to 2 milliseconds.

Example 4B is the method of example 1B, wherein the RRC signal comprises an RRC connection reconfiguration message.

Example 5B is the method of example 1B, wherein the UE is in a connected mode, and wherein a delay time on component carrier addition or release for V2X sidelink transmission comprises a time period from an end of a downlink (DL) subframe including an RRC configuration message until the UE is ready to perform V2X reception or transmission.

Example 6B is the method of example 5B, wherein the delay time comprises a first time for RRC processing and a second time for RF tuning or re-tuning.

Example 7B is the method of example 5B, wherein the delay for a single component carrier addition or release is up to 21 milliseconds.

Example 8B is the method of example 5B, wherein the delay for multiple component carrier additions or releases is up to 20+N milliseconds, where N is a number of component carriers added or released.

Example 9B is the method of example 1B, further comprising: determining that the V2X CA follows PC5 interface subframe boundaries; and in response to determining that the V2X CA follows the PC5 subframe boundaries, interrupting the V2X sidelink communication for up to one subframe.

Example 10B is the method of example 1B, further comprising: determining that the V2X follows Uu interface subframe boundaries; and in response to determining that the V2X CA follows the Uu interface subframe boundaries, interrupting the V2X sidelink communication for up to two subframes.

Example 11B is a method for a user equipment (UE), the method comprising: determining that the UE is configured in a connected mode wherein a wireless wide area network (WAN) allocates time and frequency transmission resources to the UE; processing a radio resource control (RRC) connection reconfiguration message corresponding to a vehicle-to-everything (V2X) carrier addition or release command, the RRC connection reconfiguration message comprising dedicated configuration information for V2X sidelink communication in a subframe n from the WAN; and in response to the V2X carrier addition or release command, adding or releasing one or more V2X component carriers no later than an end of WAN subframe n+21+N, where N is a number of the one or more V2X component carriers added or released.

Example 12B is the method of example 11B, wherein the connected mode comprises a sidelink transmission mode 3.

Example 13B is an apparatus for a user equipment (UE), the apparatus comprising: a memory interface to send or receive, to or from a memory device, a component carrier addition or release command; and a processor to: decode a radio resource control (RRC) signal comprising the component carrier addition or release command for vehicle-to-everything (V2X) carrier aggregation (CA) in a wireless wide area network (WAN); determine that the UE is configured for V2X sidelink communication; and in response to the component carrier addition or release command and the determination that the UE is configured for V2X sidelink communication, interrupt communications with the WAN for up to two subframes for radio frequency (RF) chain configuration.

Example 14B is the apparatus of example 13B, wherein interrupting communications with the WAN comprises suspend data communication for both uplink and downlink on a serving cell or primary cell (PCell) of a cellular communications network.

Example 15B is the apparatus of example 13B, wherein interrupting communications with the WAN for up to two subframes comprises interrupting communications with the WAN for up to 2 milliseconds.

Example 16B is the apparatus of example 13B, wherein the RRC signal comprises an RRC connection reconfiguration message.

Example 17B is the apparatus of example 13B, wherein the UE is in a connected mode, and wherein a delay time on component carrier addition or release for V2X sidelink transmission comprises a time period from an end of a downlink (DL) subframe include an RRC configuration message until the UE is ready to perform V2X reception or transmission.

Example 18B is the apparatus of example 17B, wherein the delay time comprises a first time for RRC process and a second time for RF tuning or re-tuning.

Example 19B is the apparatus of example 17B, wherein the delay for a single component carrier addition or release is up to 21 milliseconds.

Example 20B is the apparatus of example 17B, wherein the delay for multiple component carrier additions or releases is up to 20+N milliseconds, where N is a number of component carriers added or released.

Example 21B is the apparatus of example 13B, wherein the instructions further configure the apparatus to: determine that the V2X CA follows PC5 interface subframe boundaries; and in response to determining that the V2X CA follows the PC5 subframe boundaries, interrupt the V2X sidelink communication for up to one subframe.

Example 22B is the apparatus of example 13B, wherein the instructions further configure the apparatus to: determine that the V2X follows Uu interface subframe boundaries; and in response to determining that the V2X CA follows the Uu interface subframe boundaries, interrupt the V2X sidelink communication for up to two subframes.

Example 23B is a non-transitory computer-readable storage medium, the computer-readable storage medium including instructions that when executed by a processor of a user equipment (UE), cause the processor to: decode a radio resource control (RRC) signal comprising a component carrier addition or release command for vehicle-to-everything (V2X) carrier aggregation (CA) in a wireless wide area network (WAN); determine that the UE is configured for V2X sidelink communication; and in response to the component carrier addition or release command and the determination that the UE is configured for V2X sidelink communication, interrupt communications with the WAN for up to two subframes for radio frequency (RF) chain configuration.

Example 24B is the computer-readable storage medium of example 23B, wherein interrupting communications with the WAN comprises suspend data communication for both uplink and downlink on a serving cell or primary cell (PCell) of a cellular communications network.

Example 25B is the computer-readable storage medium of example 23B, wherein interrupting communications with the WAN for up to two subframes comprises interrupting communications with the WAN for up to 2 milliseconds.

Example 26B is the computer-readable storage medium of example 23B, wherein the RRC signal comprises an RRC connection reconfiguration message.

Example 27B is the computer-readable storage medium of example 23B, wherein the UE is in a connected mode, and wherein a delay time on component carrier addition or release for V2X sidelink transmission comprises a time period from an end of a downlink (DL) subframe include an RRC configuration message until the UE is ready to perform V2X reception or transmission.

Example 28B is the computer-readable storage medium of example 27B, wherein the delay time comprises a first time for RRC process and a second time for RF tuning or re-tuning.

Example 29B is the computer-readable storage medium of example 27B, wherein the delay for a single component carrier addition or release is up to 21 milliseconds.

Example 30B is the computer-readable storage medium of example 27B, wherein the delay for multiple component carrier additions or releases is up to 20+N milliseconds, where N is a number of component carriers added or released.

Example 31B is the computer-readable storage medium of example 23B, wherein the instructions further configure the computer to: determine that the V2X CA follows PC5 interface subframe boundaries; and in response to determining that the V2X CA follows the PC5 subframe boundaries, interrupt the V2X sidelink communication for up to one subframe.

Example 32B is the computer-readable storage medium of example 23B, wherein the instructions further configure the computer to: determine that the V2X follows Uu interface subframe boundaries; and in response to determining that the V2X CA follows the Uu interface subframe boundaries, interrupt the V2X sidelink communication for up to two subframes.

Example 33B is an apparatus for a user equipment (UE), the apparatus comprising: a processor; and a memory storing instructions that, when executed by the processor, configure the apparatus to: determine that the UE is configured in a connected mode wherein a wireless wide area network (WAN) allocates time and frequency transmission resources to the UE; process a radio resource control (RRC) connection reconfiguration message corresponding to a vehicle-to-everything (V2X) carrier addition or release command, the RRC connection reconfiguration message comprising dedicated configuration information for V2X sidelink communication in a subframe n from the WAN; and in response to the V2X carrier addition or release command, add or release one or more V2X component carriers no later than an end of WAN subframe n+21+N, where N is a number of the one or more V2X component carriers added or released.

Example 34B is the apparatus of example 33B, wherein the connected mode comprises a sidelink transmission mode 3.

Example 35B is a non-transitory computer-readable storage medium, the computer-readable storage medium including instructions that when executed by a processor, cause the processor to: determine that a user equipment (UE) is configured in a connected mode wherein a wireless wide area network (WAN) allocates time and frequency transmission resources to the UE; process a radio resource control (RRC) connection reconfiguration message corresponding to a vehicle-to-everything (V2X) carrier addition or release command, the RRC connection reconfiguration message comprising dedicated configuration information for V2X sidelink communication in a subframe n from the WAN; and in response to the V2X carrier addition or release command, add or release one or more V2X component carriers no later than an end of WAN subframe n+21+N, where N is a number of the one or more V2X component carriers added or released.

Example 36B is the computer-readable storage medium of example 35B, wherein the connected mode comprises a sidelink transmission mode 3.

Example 37B is a computing apparatus including a processor and a memory storing instructions that, when executed by the processor, configure the apparatus to perform the method of any of example 1B to example 12B.

Example 38B is a non-transitory computer-readable storage medium including instructions that, when processed by a computer, configure the computer to perform the method of any of example 1B to example 12B.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may include other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device (s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to “an example” means that a particular feature, structure, or characteristic described in connection with the example is included in at least one embodiment. Thus, appearances of the phrase “in an example” in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A method for a user equipment (UE), the method comprising:

decoding a radio resource control (RRC) signal comprising a component carrier addition or release command for vehicle-to-everything (V2X) carrier aggregation (CA) in a wireless wide area network (WAN);

determining that the UE is configured for V2X sidelink communication; and in response to the component carrier addition or release command and the determination that the UE is configured for V2X sidelink communication, interrupting communications with the WAN for up to two subframes for radio frequency (RF) chain configuration.

2. The method of claim 1, wherein interrupting communications with the WAN comprises suspend data communication for both uplink and downlink on a serving cell or primary cell (PCell) of a cellular communications network.

3. The method of claim 1, wherein interrupting communications with the WAN for up to two subframes comprises interrupting communications with the WAN for up to 2 milliseconds.

4. The method of claim 1, wherein the RRC signal comprises an RRC connection reconfiguration message.

5. The method of claim 1, wherein the UE is in a connected mode, and wherein a delay time on component carrier addition or release for V2X sidelink transmission comprises a time period from an end of a downlink (DL) subframe include an RRC configuration message until the UE is ready to perform V2X reception or transmission.

6. The method of claim 5, wherein the delay time comprises a first time for RRC process and a second time for RF tuning or re-tuning.

7. The method of claim 5, wherein the delay for a single component carrier addition or release is up to 21 milliseconds.

8. The method of claim 5, wherein the delay for multiple component carrier additions or releases is up to 20+N milliseconds, where N is a number of component carriers added or released.

9. The method of claim 1, wherein the instructions further configure the computer to:

determine that the V2X CA follows PC5 interface subframe boundaries; and in response to determining that the V2X CA follows the PC5 subframe boundaries, interrupt the V2X sidelink communication for up to one subframe.

10. The method of claim 1, wherein the instructions further configure the computer to:

determine that the V2X follows Uu interface subframe boundaries; and in response to determining that the V2X CA follows the Uu interface subframe boundaries, interrupt the V2X sidelink communication for up to two subframes.

11. An apparatus for a mobile communication system, the apparatus comprising:

means to determine that a user equipment (UE) is configured in a connected mode wherein a wireless wide area network (WAN) allocates time and frequency transmission resources to the UE;

means to process a radio resource control (RRC) connection reconfiguration message corresponding to a vehicle-to-everything (V2X) carrier addition or release command, the RRC connection reconfiguration message comprising dedicated configuration information for V2X sidelink communication in a subframe n from the WAN; and means to, in response to the V2X carrier addition or release command, add or release one or more V2X component carriers no later than an end of WAN subframe n+21+N, where N is a number of the one or more V2X component carriers added or released.

12. The apparatus of claim 11, wherein the connected mode comprises a sidelink transmission mode 3.

* * * * *